US012290929B2

(12) United States Patent
Hoffman et al.

(10) Patent No.: US 12,290,929 B2
(45) Date of Patent: May 6, 2025

(54) APPLIED FORCE CONTROL FOR ROBOTS

(71) Applicant: Rockwell Automation Technologies, Inc.

(72) Inventors: Jonathan D. Hoffman, Milkwaukee, WI (US); Arun K. Guru, Brookfield, WI (US); Robert J. Miklosovic, Chardon, OH (US); Maulik Kalolia, Twinsburg, OH (US); Aderiano M. da Silva, Oak Creek, WI (US); Jasper Hao Yang, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 233 days.

(21) Appl. No.: 18/123,858

(22) Filed: Mar. 20, 2023

(65) Prior Publication Data
US 2024/0316763 A1 Sep. 26, 2024

(51) Int. Cl.
*B25J 9/16* (2006.01)
*B25J 9/10* (2006.01)

(52) U.S. Cl.
CPC .............. *B25J 9/1633* (2013.01); *B25J 9/106* (2013.01); *B25J 9/1664* (2013.01)

(58) Field of Classification Search
CPC ........ B25J 9/1633; B25J 9/106; B25J 9/1664; B25J 9/00; B25J 9/16; B25J 9/1607
USPC .................. 700/245–264; 318/568.11–568.25
See application file for complete search history.

(56) References Cited

U.S. PATENT DOCUMENTS

| | | | | |
|---|---|---|---|---|
| 7,211,979 | B2* | 5/2007 | Khatib | B25J 9/1633 318/632 |
| 7,405,531 | B2* | 7/2008 | Khatib | B25J 9/1633 318/632 |
| 8,442,684 | B2* | 5/2013 | Davis | B25J 9/1633 360/245.9 |

(Continued)

OTHER PUBLICATIONS

ATI Industrial Automation, "Axially-Compliant Finishing Tools", Mar. 9, 2023.

(Continued)

*Primary Examiner* — Jaime Figueroa
(74) *Attorney, Agent, or Firm* — Fletcher Yoder, P.C.

(57) ABSTRACT

A method includes using at least one processor to detect that a tool coupled to an end effector of a robot having multiple joints is contacting a surface. The robot includes multiple joint motors configured to control multiple motions of the multiple joints. One or more control systems are configured to control each of the joint motors in a joint position mode. The method also includes identifying, via the at least one processor, a first joint of the multiple joints in response to detecting that the tool is contacting the surface. The method also includes sending, via the at least one processor, a command to at least one of the one or more control systems associated with a first joint motor of the multiple joint motors that corresponds to the first joint. The command is configured to cause the at least one of the one or more control systems to operate in a torque mode. The method also includes sending, via the at least one processor, a joint torque value to the at least one of the one or more control systems. The at least one of the one or more control systems is configured to cause the first joint to apply the joint torque value via the first joint motor.

20 Claims, 3 Drawing Sheets

(56) References Cited

U.S. PATENT DOCUMENTS

| | | | | |
|---|---|---|---|---|
| 9,002,518 | B2* | 4/2015 | Manzo | A61B 90/98 |
| | | | | 901/19 |
| 9,014,856 | B2* | 4/2015 | Manzo | A61B 34/37 |
| | | | | 901/19 |
| 9,168,195 | B2* | 10/2015 | Sankai | A61H 3/008 |
| 9,226,796 | B2* | 1/2016 | Bowling | B25J 9/009 |
| 11,192,243 | B2* | 12/2021 | Nilsson | B25J 15/0019 |
| 11,796,410 | B2* | 10/2023 | Lin | A61B 34/20 |
| 2006/0250101 | A1* | 11/2006 | Khatib | B25J 9/1633 |
| | | | | 318/568.2 |
| 2008/0046122 | A1* | 2/2008 | Manzo | A61B 90/98 |
| | | | | 700/245 |
| 2010/0121232 | A1* | 5/2010 | Sankai | A61H 1/00 |
| | | | | 600/587 |
| 2013/0110130 | A1* | 5/2013 | Manzo | A61B 34/71 |
| | | | | 606/130 |
| 2014/0039681 | A1* | 2/2014 | Bowling | A61B 34/30 |
| | | | | 700/261 |
| 2014/0163434 | A1* | 6/2014 | Sankai | A61H 1/0255 |
| | | | | 601/23 |
| 2014/0222207 | A1* | 8/2014 | Bowling | A61B 17/16 |
| | | | | 700/261 |
| 2019/0217468 | A1* | 7/2019 | Ogata | B25J 9/1633 |
| 2020/0282558 | A1* | 9/2020 | Kim | B25J 9/1607 |
| 2020/0298403 | A1* | 9/2020 | Nilsson | B23Q 3/15713 |
| 2021/0129340 | A1* | 5/2021 | Babikian | B25J 15/00 |
| 2021/0362334 | A1* | 11/2021 | Yamane | G05B 19/4155 |
| 2022/0134553 | A1* | 5/2022 | Shimamoto | B25J 9/1674 |
| | | | | 700/245 |
| 2022/0283048 | A1* | 9/2022 | Lin | A61B 90/06 |

OTHER PUBLICATIONS

ATI Industrial Automation, "Compliance Devices", Mar. 9, 2023.
Ferrobotics perfect feeling, "What is an End Effector? The Essential Robot End-of-Arm-Tool for Several Tasks", Mar. 9, 2023.

* cited by examiner

APPLIED FORCE CONTROL FOR ROBOTS

BACKGROUND

This disclosure generally relates to controlling a serial robotic system. More particularly, embodiments of the present disclosure relate to systems and methods for efficient or relatively simplistic control of force applied by the joints of a serial robotic system, at an end effector of the robotic system to a workpiece, or the like. Serial robotic systems are often used for applying forces to surrounding objects. The application of force via controlling the joints of the serial robotic system can be computationally expensive for certain control systems. As such, improved systems and methods for controlling the joints of serial robotic systems in a computationally efficient manner are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method includes using at least one processor to detect that a tool coupled to an end effector of a robot having multiple joints is contacting a surface. The robot includes multiple joint motors configured to control multiple motions of the multiple joints. One or more control systems are configured to control each of the joint motors in a joint position mode. The method also includes identifying, via the at least one processor, a first joint of the multiple joints in response to detecting that the tool is contacting the surface. The method also includes sending, via the at least one processor, a command to at least one of the one or more control systems associated with a first joint motor of the multiple joint motors that corresponds to the first joint. The command is configured to cause the at least one of the one or more control systems to operate in a torque mode. The method also includes sending, via the at least one processor, a joint torque value to the at least one of the one or more control systems. The at least one of the one or more control systems is configured to cause the first joint to apply the joint torque value via the first joint motor.

In another embodiment, a system includes a robotic system. The robotic system includes a multiple joints and multiple links. At least a portion of the multiple links is coupled to at least a portion of the multiple joints. The system also includes a drive system configured to control multiple joint motors configured to adjust multiple positions, multiple applied forces, or both of the multiple joints. The system also includes a control system configured to detect that a tool coupled to an end effector of the robotic system is contacting a surface. The control system is configured to control each of the multiple joint motors in a joint position mode via the drive system. The control system is also configured to identify a first joint of the multiple joints in response to detecting that the tool is contacting the surface. The control system is also configured to send a command to the drive system. The command is configured to cause the drive system to operate a first joint motor of the multiple joint motors in a torque mode. The control system is also configured to send a joint torque value to the drive system. The drive system is configured to cause the first joint to apply the joint torque value via the first joint motor.

In yet another embodiment, one or more non-transitory, computer readable media containing instructions that, when executed by one or more processors, cause the one or more processors to perform one or more operations. The one or more operations comprise detecting that a tool coupled to an end effector of a robot comprising multiple joints is contacting a surface. The robot comprises multiple joint motors configured to control multiple motions of the multiple joints. The one or more control systems are configured to control each of the multiple joint motors in a joint position mode. The one or more operations also comprise identifying a first joint of the multiple joints in response to detecting that the tool is contacting the surface. The one or more operations also comprise sending a command to at least one of the one or more control systems associated with a first joint motor of the multiple joint motors that corresponds to the first joint. The command is configured to cause the at least one of the one or more control systems to operate in a torque mode. The one or more operations also comprise sending a joint torque value to the at least one of the one or more control systems. The at least one of the one or more control systems is configured to cause the first joint to apply the joint torque value via the first joint motor.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
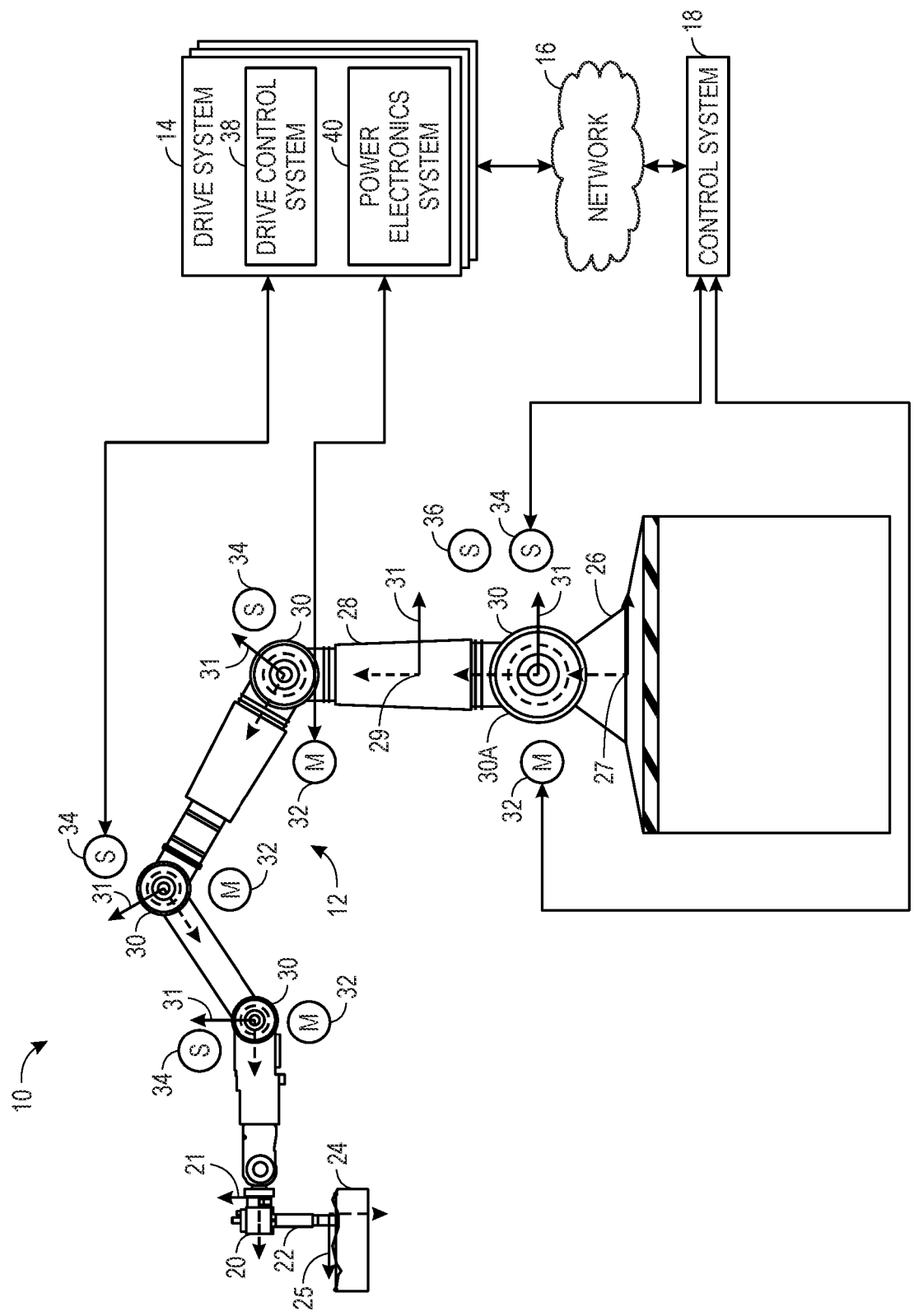
FIG. 1 is a diagrammatical representation of an example serial robotic system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed toward systems and methods of controlling a serial robotic system. As discussed above, serial robotic systems are often used for applying forces to surrounding objects. The application of force via controlling the joints of the serial robotic system can be computationally expensive for certain control systems. By way of example, a number of serial robotic systems may have the capability to control the amount of force applied by a robot end effector to a surface by controlling an amount of torque exerted by each joint of the serial robotic system. In this manner, a drive system may be tasked with controlling the operation of the serial robotic system based on the torque forces applied by each joint (e.g., torque mode). With this in mind, some serial robotic systems may then move to provide the requested torque forces at each joint. However, to effectively operate in the torque mode, the drive system that controls the torque force at each joint may receive measured joint torques associated with the joints and adjust the torque commands provided to the joints to achieve the goal torques. In such configurations, the drive system tasked with processing the data received from the serial robotic device may be burdened with processing received torque data to determine updated commands for motors to control the torque forces for the respective joints. The computational load may be especially high due to the drive system converting quantities representative of joint torque to motor voltages or currents to use to drive respective motors. As such, the torque mode operation may be significantly more computationally expensive compared to adjusting joint positions of the serial robotic system in accordance with a position mode of operation. That is, instead of managing the forced applied at the various joints, the drive system may adjust the positions of the joints to achieve desired positions without regard to the forces exerted by the joints.

By way example, low complexity robot control methods may use direct kinematics equations to calculate joint position based on desired robot tool position. These equations do not include any dynamics and therefore cannot be directly used to control velocity, speed, acceleration, or applied force. In contrast, high complexity robot control methods may use dynamics equations that relate all of the states of the joints (e.g., position, velocity, acceleration, torque) to each state (e.g., position, velocity, acceleration, torque) of the tool. These dynamics equations are significantly more complex because they include more states and involve integration between states.

Keeping this in mind, the present embodiments described herein include overcoming one weakness of the low complexity robot control methods, while maintaining its simplicity. That is, by using just one joint in a torque control mode to control force and ignore position, velocity, and acceleration, the drive system may control a force applied at a robot end effector with a direct and simple transfer function. As such, using the torque control mode, the drive system may control force for one joint and control positions of the remaining joints of the robot system.

In this way, in certain embodiments, a control system (e.g. distributed control system, server, etc.) may first send instructions to the drive control systems of the serial robotic system to cause the robot joints to move in accordance with determined joint positions, as opposed to joint torques. While moving the joints in accordance with the desired joint positions, the control system may receive a signal indicative of a robot end effector or some associated joint making contact with some surface. In response to receiving a signal indicative of the robot end effector making surface contact, the control system may identify one joint to user to control a respective torque force and may send joint torque data of the identified joint to the drive system.

The drive system may then adjust an operation of a respective motor to cause the identified joint to apply a calculated or regulated torque, thereby applying a desired force via the robot end effector. It should be noted that while the particular joint is operating in a torque mode, the other joints continue to move according to desired position data. That is, the drive systems may continue to control the other joints using the position mode. By reducing the number of joints controlled via the torque mode, the computational burden of the drive system and/or control system may be significantly mitigated as compared to controlling multiple joints using the torque mode. That is, the computation burden to control both torque and position involves a higher order model with more states and integrators, as opposed to the present method in which the drive system may control position and torque with separate and relatively simpler models. Additional details with regard to the aforementioned embodiments will be discussed in more detail with reference to FIGS. 1-5 below.

By way of introduction, FIG. 1 is a diagrammatical representation of an example robotic system 10. The following brief description of the example robotic system 10 is provided herein to help facilitate a more comprehensive understanding of how the embodiments described herein may be applied to improve the control of serial robotic systems. As such, the embodiments described herein should not be limited to be applied to the example depicted in FIG. 1.

Referring now to FIG. 1, the robotic system 10 may include a robotic manipulator 12, drive system(s) 14, a network 16, and a control system 18. It should be noted that while the robotic system 10 of FIG. 1 illustrates a single-chain robotic manipulator with four revolute joints, the present embodiments described herein may be employed with a variety of types of robotic manipulators. For example, the robotic manipulator 12 may be a single-chain (e.g., single end effector) or multi-chain (e.g., multiple end effectors) robotic manipulator. The robotic manipulator 12 may be a serial robotic manipulator (e.g., articulated robot), parallel robotic manipulator (e.g., Stewart platform, delta robot), selectively compliant articulated robot assembly, or linear robot (e.g., gantry robot, planar robot). The robotic manipulator 12 may include a mixture of different types of joints (e.g., prismatic, revolute, cylindrical) or, as shown in the illustrated embodiment, may solely include joints of a single type (e.g., all prismatic joints, all revolute joints, etc.). The robotic manipulator 12 may also include an end effector 20 to which a tool 22 may be attached. A surface 24 may be within the reachable workspace of the robotic manipulator 12.

The robotic manipulator 12 pertaining to the embodiments described herein may be used for a variety of applications which involve moving the end effector 20 of the robotic manipulator 12 through space and/or applying a force via the tool 22 onto the surface 24. A flange reference frame 21 may be attached to the center of the flange where the end effector 20 is mounted to the robotic manipulator 12. Similarly, a tool center point reference frame 25 may be attached to the center of the tip of tool 22. For example, the robotic manipulator 12 may be used for applying a treatment to the surface 24 (e.g., grinding, sanding, polishing, painting, etc.). The robotic manipulator 12 may also be used for grasping and moving objects (e.g., pick-and-place). In certain embodiments, the robotic manipulator 12 may be equipped with a variety of sensors (e.g., camera, load cell, distance laser) for sensing various properties (e.g., force, temperature, tension) associated with the surface 24 and/or surrounding environment.

In the illustrated embodiment, the robotic manipulator 12 is mounted via base 26. A robot base reference frame 27 (e.g., robot base frame) may be attached to the center of the base 26 (e.g., where the robot touches the ground or pedestal). In some embodiments, the robotic manipulator 12 may include links 28 that may be rotatively coupled with each other via joints 30. A link reference frame 29 may be attached to the center of each link 28 (e.g., center of mass of each link). Likewise, a joint reference frame 31 may be attached to each joint 30. The robotic manipulator 12 may include at least two joints 30 and the robotic manipulator 12 to enable the end effector 20 to move with at least one degree of freedom. Each joint of the robotic manipulator 12 may include a joint motor 32 (e.g., DC motor, servo motor, stepper motor) and a joint position sensor 34 (e.g., relative rotary encoder, absolute rotary encoder). The joint motors 32 may move (e.g., rotate, slide) each link 28 of the robotic manipulator 12 with respect to the previous link 28. The joint motors 32 may be electrically coupled to the drive system(s) 14. Each joint position sensor 34 may measure an observed angular position of the respective joint motor 32 relative to a reference position of the joint motor 32 (e.g., calibration position), and output a signal corresponding to the angular position of each joint motor 32 to the drive system(s) 14, thereby allowing the drive system(s) 14 to receive joint position data from the joint motors 32. Each joint motor 32 may also accept a commanded joint position from the drive system(s) 14 and move to the commanded joint position, thereby enabling the drive system(s) 14 to write joint position data to the joint motors 32.

At least one joint 30A of the robotic manipulator 12 may include a joint torque sensor 36 (e.g., strain gauge, capacitive torque sensor). The joint torque sensor 36 may measure an observed torque applied to the joint 30A and send a signal corresponding to the observed torque to the drive system(s) 14, thereby enabling the drive system(s) 14 to read data representing a joint torque from said joint 30. The joint(s) 30 of the robotic manipulator 12 that include(s) the joint torque sensor 36 may also receive a commanded joint torque from the drive system(s) 14, and move the corresponding joint motor 32 according to the commanded joint torque, thereby enabling the drive system(s) 14 to command (e.g., write to) said joint via a joint torque datatype. The data received by the control system 18 from the joint torque sensor 36 may be transmitted directly from the torque sensor 36 (e.g., via an ethernet gateway) or, in certain embodiments, the indirectly via the drive system(s) 14 before being transmitted to the control system 18. It should be understood that while the illustrated embodiment shows joint 30A as being the joint closest to the base 26, any of the joints 30 of the robot manipulator 12 may include a joint torque sensor 36.

The drive system(s) 14 may be located in a separate control box or, in certain embodiments, physically proximate to the robotic manipulator 12. The drive system(s) 14 may include drive control system(s) 38 and power electronics system(s) 40. The drive control system(s) 38 may include processing circuitry or the like that may be used to determine how control the joint motors 32, such that an actual position of each joint motor 32 follows a commanded position. The drive control system(s) 38 may implement a feedback control loop (e.g., PID control) using motor position data received from the joint position sensors 34. In this manner, the drive control system(s) 38 may ensure that the actual position of each joint motor 32 closely tracks the commanded joint position. In certain embodiments, the commanded joint position for each joint motor 32 may be updated at successive clock time steps, regulated by an internal clock of the drive system(s) 14. The power electronics system(s) 40 may include electrical components (e.g., diodes, IGBT, thyristors) that may adjust voltage waveforms, such that they may distributed to each of the joint motors 32. Indeed, the drive control system 38 may determine the voltage waveforms to provide to the joint motors 32 based on achieving the commanded joint positions. For example, if the drive control system(s) 38 may determine that one joint 30A is to move faster than other joints 30, the drive control system(s) 38 may send a signal to the power electronics system(s) 40 requesting that an appropriate voltage waveform(s) is sent to the respective joint motor 32 to cause the joint 30A to move accordingly.

In certain embodiments, each joint motor 32 may include a corresponding drive system 14, drive control system 38, and power electronics system 40. In this joint-based drive system configuration, drive system components of one joint may be enabled to communicate with drive system components of another joint. For example, communication between drive control systems 38 of individual joints 30 may enable the utilization of control signals from other joints to provide more robust control. Likewise, communication between power electronics systems 40 of individual joints 30 may enable the utilization of power distribution data from other joints 30 when determining allocation of power.

In some embodiments, the drive system(s) 14 may control a motion of each of the joints 30 of the robotic manipulator 12 based on a particular control mode, as specified by a command. That is, the joint 30 and its corresponding drive system 14 of the robotic manipulator 12 may be operating in a joint position mode when the corresponding drive control system 38 receives a commanded joint position and subsequently sends a signal to the corresponding joint motor 32 to cause the joint motor 32 to move the joint 30 to the commanded joint position. On the other hand, the joint 30 and its corresponding drive system 14 of the robotic manipulator 12 may be operating in a joint torque mode (e.g., joint impedance mode, joint force mode, etc.) when the corresponding drive control system 38 receives a commanded joint torque. While the joint 30 is being controlled in torque mode, the corresponding drive control system 38 converts the commanded joint torque into a series of commanded joint positions, such that the amount of torque used to move the corresponding joint motor 32 through the series of command joint positions approximates the commanded joint torque. With the foregoing in mind, the drive system(s) 14 of the embodiments described herein may control at least one joint 30 of the robotic manipulator 12 in torque mode, while controlling the remaining joints 30 in position mode. While the robot system 10 described herein utilizes joint position mode and joint torque mode, the drive system(s) 14 may be capable of being placed into additional modes (e.g., velocity mode).

The control system 18 may be communicatively coupled to the drive system(s) 14, the joint motors 32, the joint position sensors 34, the joint torque sensor(s) 36, and the like via the network 14 or other suitable communication protocol. In some embodiments, the control system 18 may execute an algorithm (e.g., program, executable code) to cause the robotic manipulator 12 to perform a desired task. For example, the control system 18 may receive a request for the joints 30 to track a desired trajectory of joint positions and/or joint torques. In response to receiving the request, the control system 18 may send commanded joint positions and/or commanded joint torques to the drive system(s) 14. The drive system(s) 14 may then use this data to update a setpoint value in the drive control system(s) 38, which then control the joint motors 32 to track the commanded values via the power electronics system(s) 40. The control system 18 may also command the drive system(s) 14 to switch the control mode for one or more joint motors 32 from joint position mode to joint torque mode or vice versa. For example, the drive system(s) 14 may interpret commands from a software development kit (SDK) specific to the drive system(s) 14. The SDK may include commands that involve switching the mode in which the drive system(s) 14 controls join motors 32, reading and/or writing of joint position and/or joint torque data, and handling of exceptions.

With the foregoing in mind, the control system 18 may be coupled to the drive system(s) 14 via the network 14, via direct communication links, or the like. The control system 18 may receive signal(s) from the joint position sensor(s) 34 and the joint torque sensor(s) 36 via any suitable communication component. In some embodiments, the control system 18 be may be implemented in a separate server (e.g., dedicated computer, controller) as compared to the drive system(s) 14, but it should be noted that, in some embodiments, the drive system 14 may include the control system 18. That is, the hardware used for the control system 18 may be located alongside or with the drive system(s) 14. Furthermore, while the drive system(s) 14 may be used for individual joint control, power distribution, and selection of the control mode for operating each joint motor 32, there may be some embodiments where these tasks are delegated to the control system 18.

Figure 2:
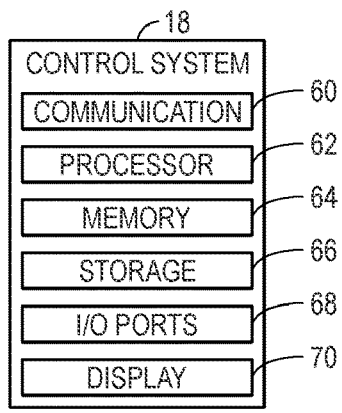
FIG. 2 is a block diagram of a control system, in accordance with an embodiment of the present disclosure.

FIG. 2 is a block diagram of a control system 18 that may be employed in any suitable robotic system 10 to interface with industrial automation devices, computing devices (e.g., computing device), or cloud computer systems (e.g., cloud-based computing system). The control system 18 may include a communication component 60, a processor 62, a memory 64, a storage 66, input/output (I/O) ports 68, a display 70, and the like. The communication component 60 may be a wireless or wired communication component that may facilitate communication between the robotic system 10 and other communication capable devices.

The processor 62 may be any type of computer processor or microprocessor capable of executing computer-executable code. The processor 62 may also include multiple processors that may perform the operations described below. The memory 64 and the storage 66 may be any suitable articles of manufacture that can serve as media to store processor-executable code, data, or the like. These articles of manufacture may represent computer-readable media (e.g., any suitable form of memory or storage) that may store the processor-executable code used by the processor 62 to perform the presently disclosed techniques. Generally, the processor 62 may execute software applications that include programs that enable the robotic manipulator 12 to perform a series of tasks. The software applications may communicate with the drive system(s) 14 and/or robotic manipulator 12 and receive data from the joint position sensor(s) 34, joint torque sensor(s) 36, and other sensors coupled to the robotic manipulator 12. The data received from these sensors may be received in real-time, in near real-time, or in a deferred batch (e.g., via a stored data file).

The memory 64 and the storage 66 may also be used to store the data, analysis of the data, the software applications, and the like. The memory 64 and the storage 66 may represent non-transitory computer-readable media (e.g., any suitable form of memory or storage) that may store the processor-executable code used by the processor 62 to perform various techniques described herein. It should be noted that non-transitory merely indicates that the media is tangible and not a signal.

The I/O ports 68 may be interfaces that couple to other peripheral components such as input devices (e.g., keyboard, mouse), sensors, input/output (I/O) modules, and the like. I/O modules may enable the drive system(s) 14, the robotic manipulator 12, and/or other devices to communicate with each other or other devices in the robotic system 10.

The display 70 may depict visualizations associated with software or executable code being processed by the processor 62. In one embodiment, the display 70 may be a touch display capable of receiving inputs (e.g., parameters for displaying data) from a user. As such, the display 70 may serve as a user interface to communicate with the drive system(s) 14 and/or the robotic manipulator 12. The display may be used to display a graphical user interface (GUI) for monitoring the robotic manipulator 12. The display 70 may be any suitable type of display, such as a liquid crystal display (LCD), plasma display, or an organic light emitting diode (OLED) display, for example. In some embodiments, the user interface may be characterized as an HMI, a human-interface machine, or the like.

Figure 3:
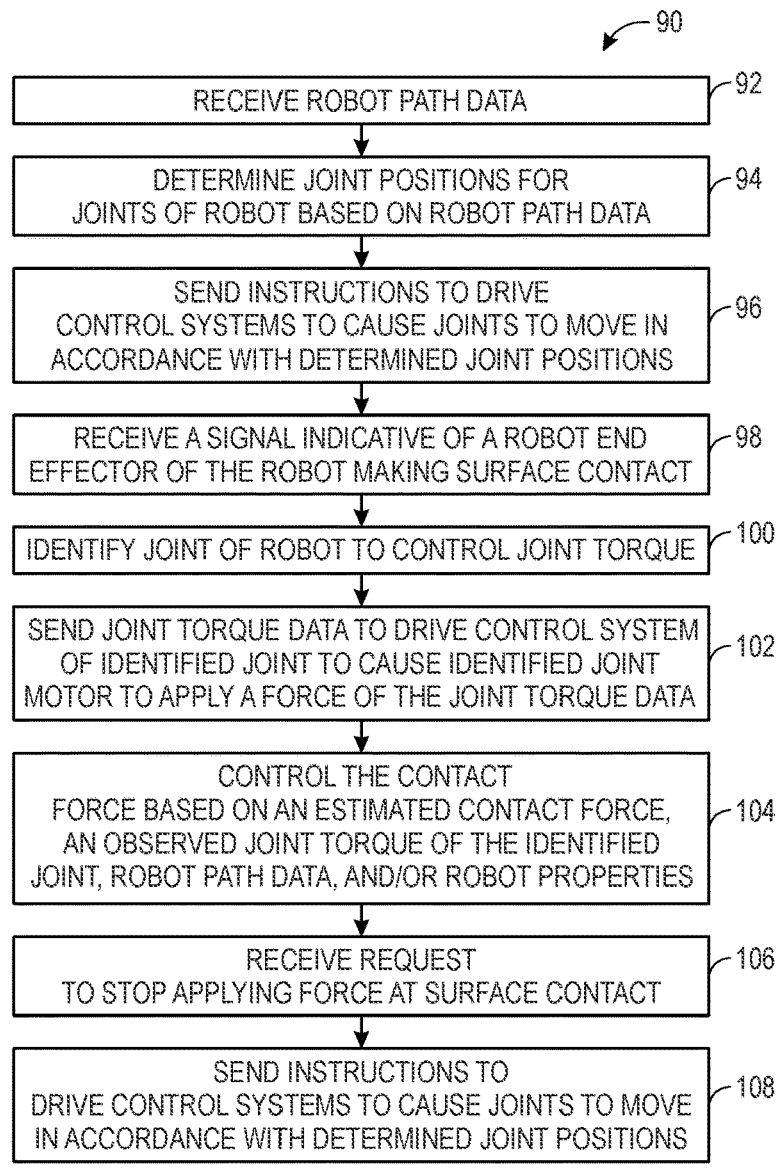
FIG. 3 is a flowchart of a process used for controlling the joints of the serial robotic system of FIG. 1, in accordance with an embodiment of the present disclosure.

Keeping this in mind, FIG. 3 illustrates a flow chart of a method 90 for efficiently controlling movement of the robotic manipulator 12. Although the following description is detailed as being performed by the control system 18, it should be noted that any suitable processing system may perform the method 90. Further, although the method 90 is described as being performed in a particular order, is should be understood that the method 90 may be performed in any suitable order. The robotic manipulator shown in FIG. 4 will be used for the purpose of describing the method 90.

Referring now to FIG. 3, at block 92, the control system 18 may receive robot path data. In certain embodiments, the robot path data may include a series (e.g., time series, trajectory) of via points (e.g., way points, data points). Each via point may include a Euclidean position of the flange reference frame 21 relative to the robot base reference frame 27, a corresponding orientation of the flange reference frame 21 relative to the robot base reference frame 27, and a time (e.g., timestamp relative to initial time of first via point) at which the flange reference frame 21 is to intersect the via point. The orientation of the flange reference frame 21 may be in the form of a rotation matrix, quaternion, and the like. In some embodiments, the robot path data may be provided as described above, but with the tool center point reference frame 25 used in place of the flange reference frame 21.

At block 94, the control system 18 may determine joint positions for the joints 30 of the robotic manipulator 12 based on the robot path data. In certain embodiments, the control system 18 may execute an algorithm (e.g., inverse kinematics solver) to find multiple inverse kinematics solutions (e.g., joint positions of joints 30) corresponding to the position and orientation associated with each via point. The algorithm executed by control system 18 may then select a solution based on additional constraints provided in the algorithm. For example, if the robotic manipulator 12 has six or fewer degrees of freedom, the algorithm executed by control system 18 may be able to determine a finite number of analytical (e.g., formulaic) inverse kinematic solutions and select one of the analytical solutions. In other embodiments, an inverse kinematics solver (e.g., Heuristic solvers, Jacobian methods, Newton-based convergence methods) may be used to approximate one or more inverse kinematic solutions, regardless of the number of degrees of freedom of the robotic manipulator 12, and the algorithm executed by control system 18 may select a solution based on one or more additional constraints. The inverse kinematic solver may use geometric properties of the robotic manipulator 12, including the joint reference frames 31, the flange reference frame 21, the tool center point reference frame 25, and/or the lengths of the links 28.

In block 96, the control system 18 may send instructions to the drive control systems 38 to cause the joints 30 to move in accordance with the determined positions. In one embodiment, the control system 18 may execute an algorithm which streams (e.g., iteratively) single via points to the drive control systems 38 at a certain frequency (e.g., determined by the control system 18). Upon the drive control systems 38 reading each via point individually, the drive control systems 38 may update a setpoint (e.g., reference signal) in a controller (e.g., closed-loop control, PID control) used to control the position of a joint motor 32. In certain embodiments, each joint motor 32 may be controlled by a corresponding controller in the drive control systems 38.

In other embodiments, the instructions sent by the control system 18 to the drive control systems 38 may include sending a packaged series of determined joint positions and a corresponding series of timestamps, such that the control system 18 may send all the via points concurrently. At some time after receiving the packaged series of via points, the drive control systems 38 may implement an algorithm which updates the controller with a new determined joint position (e.g., contained in each via point) at the time provided by the corresponding timestamp of each via point.

In response to the drive control systems 38 updating the setpoint of the controller, the drive control systems 38 may cause a commanded joint position to track the updated setpoint. Additionally and/or alternatively, the controller in the drive control systems 38 may compute a joint position error by taking the difference between an observed joint position of the joint motor 32 and the updated setpoint (e.g., reference joint position). As the commanded joint position converges to the updated joint position setpoint, the drive control systems 38 (e.g., controller) may continually adjust the current provided to the joint motors 32 via the corresponding power electronics system 40 to cause the joint positions to achieve the commanded joint position and/or joint position error. The power electronics system 40 may then use the commanded joint position and/or joint position error to determine the appropriate electrical (e.g., voltage/current) waveform to send to the corresponding joint motor 32. In certain embodiments, the drive control systems 38 may use interpolation between consecutive via points such that the robotic manipulator 12 moves smoothly between consecutive via points (e.g., when spacing between consecutive via points is significant). While the above description of block 96 may apply to single joint motor 32, it should be understood that multiple joint motors 32 may be used.

In block 98, the control system 18 may receive a signal that indicates that the end effector 20 (e.g., tool 22) of the robotic manipulator 12 is making surface contact with the surface 24. In one embodiment, the geometry of the surface 24 and its location relative to the robot base reference frame 27 may be known by the control system 18. The tool center point reference frame 25 may then be determined (e.g., Euclidean position of the tool center point) and compared to the location of the surface 24 (e.g., using a collision detection algorithm). The control system 18 may deduce that the tool 22 of the robotic manipulator 12 is making surface contact if the tool center point reference frame 25 intersects (e.g. collides with) the surface 24.

In certain embodiments, the surface contact between the tool 22 and the surface 24 may be determined using one or more sensors. A force sensor (e.g., load cell, strain gage) may be coupled to the tool 22, such that the force sensor detects a load in response to the tool 22 making physical contact with the surface 24. For example, a force-torque sensor may be placed between the flange of the robotic manipulator 12 and the end effector 20. In response to the force sensor measuring a load that breeches a predetermined threshold force, the control system 18 may determine that the tool 22 is making surface contact with surface 24.

In certain embodiments, optical sensor(s) (e.g., laser, depth camera) may be used to determine when the tool 22 makes surface contact with surface 24. For example, an image sensor or camera (e.g., eye-in-hand, eye-to hand) may be used to capture images of the vicinity in which the tool 22 is to make surface contact with the surface 24. The images captured by the camera may be used in conjunction with machine learning techniques (e.g., neural network(s)) to determine surface contact between the tool 22 and the surface 24 using training data.

It should be understood, that a combination of the techniques described for block 98 for determining surface contact between the tool 22 and surface 24 may be used. For example, the control system 18 may detect surface contact using a force sensor augmented by the location of the tool center point reference frame 25. Similarly, a camera may be used in conjunction with the force sensor and/or tool center point reference frame 25. It may be appreciated that using more than one type of sensor may provide redundancy in the event that a sensor fails.

In block 100, the control system 18 may identify the joint 30A of the robotic manipulator 12 to control joint torque. In some embodiments, a single predetermined joint 30A is identified by the control system 18 to control torque. For example, the control system 18 may repeatedly select the joint 30 closest to the robot base reference frame 27 for controlling torque.

In other embodiments, the control system 18 may designate a new joint 30A of the remaining joints 30. That is, the control system 18 may switch which of the joints 30 is designated as joint 30A. For example, the control system 18 may first identify one joint 30 (e.g., joint 1) as the identified joint 30A, and at a later time designate another joint 30 (e.g., joint 2) as the identified joint 30A. In some embodiments, the control system 18 may identify multiple joints 30A for controlling joint torque. That is, at any given time there may be multiple (e.g., two, three, etc.) joints 30A. The multiple joints 30A may be consecutive (e.g., joint 1 and joint 2) or non-consecutive (e.g., joint 1 and joint 3).

In certain embodiments, the joint 30A identified by the control system 18 may be based on one or more factors. For example, the control system 18 may identify the joint 30A corresponding to a link 28 (e.g., axial direction cosine of link reference frame 29) that is most parallel to the surface 24 (e.g., tangent plane at point of contact with surface 24), which may correspond to the joint 30 which contributes the most torque at a given pose of the robotic manipulator 12. It follows that the joint 30A identified by the control system 18 may change over a span of time as the end effector 20 traverses the robot path data. It should be understood that additional and/or alternative factors besides the pose of the links 28 relative to the surface 24 may be used by the control system 18 for identifying joint 30A. It should also be understood that while the control system 18 may identify the joint 30A in response to determining surface contact between the tool 22 and the surface 24, the identification of joint 30A may not be contingent on the tool 22 making surface contact.

In response to the joint 30A being identified by the control system 18, the drive control system 38 (e.g., corresponding to joint 30A) may, in some embodiments, switch the control mode used to control the joint motor 32 corresponding to joint 30A. For example, in response to receiving a signal that indicates tool 22 is contacting surface 24, the control system 18 may send a command to the drive system 14 which switches the controller from a "joint mode" controller to a "torque mode" controller. That is, the controller may execute an application or software that allows it to determine and send control commands to the joint motor 32 from being based on joint positions to being based on torques. For instance, the torque mode controller may accept a desired torque value and, in certain embodiments, receive feedback from the corresponding torque sensor 36 to modify the torque forces applied to the joint 30A via the joint motor 32 to achieve the desired torque value. In other words, the torque mode controller may output a control variable (e.g., a series of joint position values) which enables the corresponding joint motor 32 to track a desired torque.

In block 102, the control system 18 may send joint torque data to the drive control systems 38 of the identified joint 30A to cause the joint motor 32 corresponding to the identified joint 30A to apply a force (e.g., torque) of the joint torque data. For example, the joint torque data may be used to update the setpoint of the torque mode controller, causing the torque mode controller to output a signal (e.g., commanded torque signal). In certain embodiments, the joint torque data may be computed by the control system 18 after the joint 30A is identified. In other embodiments, the joint torque data may be packaged along with the robot path data, so as to also be contained in the time series of joint positions (e.g., trajectory of joint positions), thereby enabling the control system 18 to receive the joint torque data along with (e.g., as apart of) the robot path data.

In certain embodiments, when the control system 18 switches the identified joint 30A to another joint 30 or adds an additional identified joint 30A, the drive control system 38 corresponding to the newly identified joint 30A may be enabled (e.g., via a torque mode controller) to cause the corresponding joint motor 32 of the newly identified joint 30A to apply a force corresponding to the joint torque data. The drive control system 38 corresponding to the previously identified joint 30A (e.g. prior to the control system 18 switching the identified joint 30A) may be reverted to sending position data to the previously identified joint 30A.

In certain embodiments, the control system 18 may send joint torque data to multiple drive control systems 38 corresponding to multiple identified joints 30A, as described above for the single identified joint 30A. In some embodiments, the joint torque data sent to the multiple drive control systems 38 may be of varying magnitudes, such that the amount of force applied by the multiple identified joints 30A (e.g., corresponding to the joint torque data) is distributed across the multiple identified joints 30A based on one or more factors. For example, one of the multiple identified joints 30A may correspond to a link 28 which is more parallel to the surface 24, enabling said identified joint 30A to exert a greater force on the tool 22 using a smaller force applied by the correspond joint motor 32. In other embodiments, the control system 18 may apply an optimization algorithm to minimize a cost variable (e.g., amount of total power consumed by the identified joints 30A) to determine how the torque is to be distributed across the multiple identified joints 30A.

In block 104, the control system 18 may control the contact force (e.g., applied by the tool 22 on the surface 24) based on an estimated contact force (e.g., as a function of the tool 22 being subjected to force control against the surface 24), an observed joint torque, the robot path data, and/or properties of the robotic manipulator 12. In certain embodiments, the estimated contact force may be obtained via a force sensor (e.g., load cell, drive/CIP-connected sensor) coupled to the flange of the robotic manipulator 12 (e.g., in between the flange and the end effector 20). For example, the force sensor may provide three axial forces and three axial torques in the flange reference frame 21. If the tool 22 is perpendicular to the surface 24, one of the axial forces obtained by the force sensor may be used for the estimated contact force. When the tool 22 is oriented at an angle relative to the surface 24, the contact force may be estimated by using a relationship between the robot path data (e.g., orientation of the robot end effector 20) and the axial forces from the force sensor. In other embodiments, the estimated contact force may be obtained using the observed joint torque, the robot path data, and/or properties of the robotic manipulator 12. One example methodology for determining the estimated contact force sans a force sensor coupled to the robotic manipulator 12 will be described in more detail in the description of FIG. 4 and FIG. 5.

The estimated (e.g., observed) contact force may then be used to control the commanded contact force between the tool 22 and the surface 24 via one or more control algorithms executed by control system 18. For example, the joint 30A may be controlled using an impedance control law, which may include stiffness and damping parameters multiplied by position and velocity errors, respectively. The impedance control law may also include an external torque term, which may be determined by transforming the estimated contact force using the transpose of the Jacobian of the robotic manipulator 12. In another example, the joint 30A is provided with a commanded torque calculated based on a torque to force transfer function. In some embodiments, the transfer function may be based on one or more inertial (e.g., mechanical) properties and/or configuration (e.g., pose) of the robotic manipulator 12. The other joints 30 (e.g., joints 30 that are not identified joints 30A) may be controlled using a position control loop which may include the desired joint position from the robot path data. In this manner, the torque applied to identified joint 30A may be used to control the contact force made by the tool 22 on the surface 24.

In block 106, the control system 18 may receive a request to stop applying a force at the point of contact on surface 24.

In certain embodiments, the request may be a deterministic signal based on a predetermined factor. For example, the control system 18 may receive the request after the robot manipulator 12 has finished traversing a pre-planned trajectory, or the control system 18 may receive the request after a pre-determined period of time. In other embodiments, the request may be non-deterministic, such as the robot receiving a signal from a sensor (e.g., obstacle avoidance), or receiving a signal from a human operator (e.g., in response to a pressed button).

In block 108, the control system 18 may send instructions to the drive control systems 38 to cause the joints 30 to move in accordance with determined joint positions. For example, in response to receiving the request to stop applying a force to surface 24, the control system 18 may revert the identified joint 30A back to position mode. The control system 18, via the drive control systems 38, may then send commanded joint positions to the joint motors 32 causing the joints 30 to move in accordance with a determined joint position path (e.g., joint position trajectory).

In certain embodiments, the estimated contact force applied by the tool 22 to the surface 24 may be determined using a relationship between an observed torque of the identified joint, the state of the joints 30 (e.g. joint position, joint velocity, joint acceleration, etc.), and inertial properties of the robotic manipulator 12. The estimated contact force may then be utilized with a known control technique (e.g. proportional control, direct force control, etc.) for regulating the force applied by the end effector 20 to a reference force, thereby eliminating the need for coupling a force sensor (e.g. load cell) to the robot end effector 20.

Figure 4:
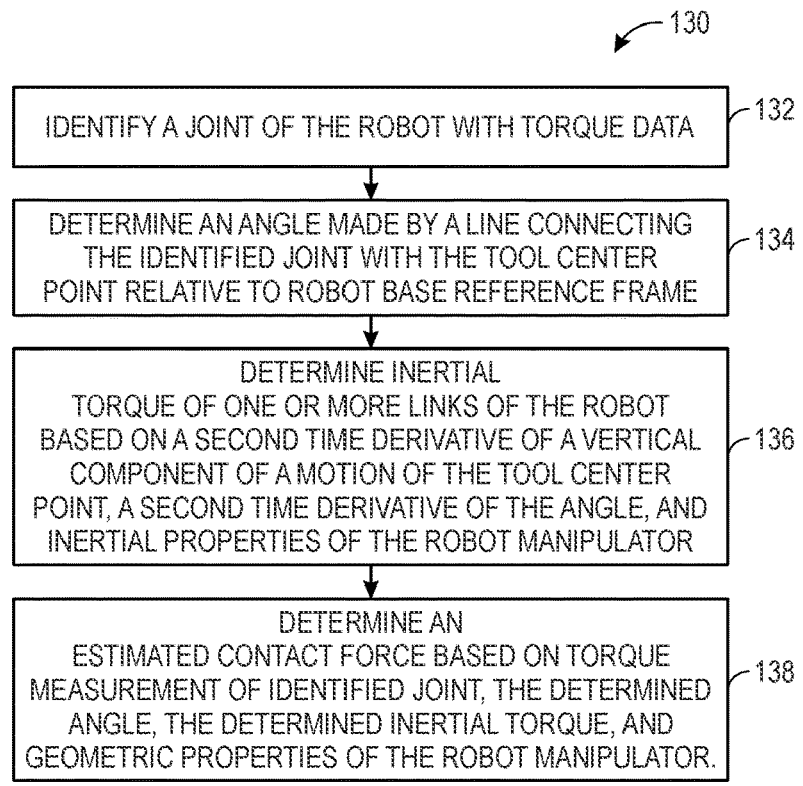
FIG. 4 is a diagrammatical representation of a serial robot system that may execute the process of FIG. 3, in accordance with an embodiment of the present disclosure.

Keeping this in mind, FIG. 4 illustrates a flow chart of a method 130 for estimating the contact force between the tool 22 and surface 24 without the use of a force sensor. Although the following description is detailed as being performed by the control system 18, it should be noted that any suitable processing system may perform the method 130. Further, although the method 130 is described as being performed in a particular order, is should be understood that the method 130 may be performed in any suitable order. The robotic manipulator 12 shown in FIG. 5 will be used for the purpose of describing method 130.

Figure 5:
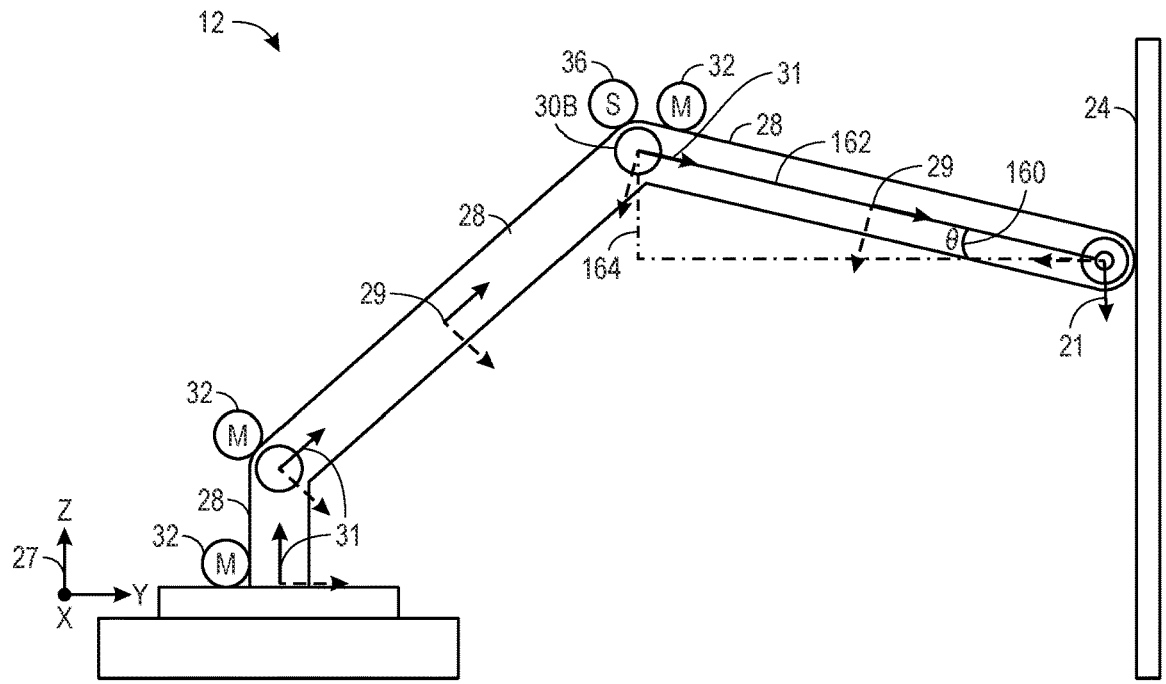
FIG. 5 is a diagrammatical representation of an example serial robotic system having links that are positioned at certain angles relative to a surface for estimating a force or torque value, in accordance with an embodiment of the present disclosure.

Referring now to FIG. 4 and FIG. 5, in block 132, the control system 18 may identify a joint 30B of the robotic manipulator 12 that includes a torque sensor 36. In certain embodiments, the joint 30B may already be known by the control system 18. In other embodiments, the control system 18 may identify joint 30B as the same joint 30 designated as joint 30A (e.g., joint 30 used for commanding torque). In addition, the control system 18 may identify the joint 30B based on whether torque feedback data (e.g., physical torque sensor data, estimated torque based on drive voltage and/or current reference) is available for the joint 30B.

In block 134, the control system 18 may determine an angle 160 made by a line (e.g., line 162) connecting the identified joint 30B with the tool center point (e.g., tool center point reference frame 25) relative to the robot base reference frame 27. In certain embodiments, the angle 160, θ, may be determined using a relationship (e.g., inverse sine) of a ratio of two quantities. The first quantity (e.g., numerator) may be a difference between a vertical position $z_{j\_i}$ of the joint 30B and the vertical position $z_{ee}$ of the end effector 20 (e.g., difference in indicated by line 164), where i may be defined as the joint 30 (e.g., joint 1, joint 2, etc.) designated as joint 30B. The second quantity (e.g., denominator) may be the length l of the line 162. In certain embodiments, this relationship may be represented by Equation 1.

$$\theta = \sin^{-1}\left(\frac{z_{j\_i} - z_{ee}}{l}\right) \quad \text{(Equation 1)}$$

Although FIG. 5 depicts the joint 30B as being the third joint from the robot base reference frame 27, and also depicts l as being the length between the third joint and the end effector 20, it should be noted that joint 30B may be any joint 30 of the robotic manipulator 12 that has a torque sensor 36.

In block 136, the control system 18 may determine an inertial torque $T_J$ of the links 28 between the identified joint 30B and the tool using a relationship between a second time derivative of a vertical component of a motion $\ddot{y}_{ee}$ of the end effector 20, a second time derivative of the angle 160, $\ddot{\theta}$, and inertial properties of the robotic manipulator 12 (e.g., mass of links 28, length l). In certain embodiments, this relationship may be represented by Equation 2.

$$\tau_I \approx \left(\frac{\ddot{y}_{ee}}{l} + \ddot{\theta}\right) * \sum_i^n m_i * \frac{l*l}{4} \quad \text{(Equation 2)}$$

In the above equation, the summation of the masses $m_i$ of the links 28 may be the summation of the masses of the links 28 which appear after the joint 30B in the kinematic chain of the robotic manipulator 12, where i may be defined as the joint 30 (e.g., joint 1, joint 2, etc.) designated as joint 30B, and where n may be defined as the final link 28 in the kinematic chain of the robotic manipulator 12. Although FIG. 5 depicts joint 30B as being joint 3, it should be noted that joint 30B may be any joint 30 of the robotic manipulator 12 that has a torque sensor 36. Likewise, while FIG. 5 depicts l as being the length between joint 3 and the end effector 20, it should be understood that l may be the length between any joint 30 and the end effector 20.

In block 138, the control system 18 may determine an estimated contact force $F_{est}$ (e.g., between tool 22 and surface 24) based on a relationship between a torque measurement $\tau_i$ of the identified joint 30B, the determined angle 160, θ, the determined inertial torque $\tau_i$, and geometric properties of the robotic manipulator 12. One equation corresponding to this relationship may correspond to Equation 3.

$$F_{est} = \frac{\tau_i + \tau_I}{l\cos\theta} \quad \text{(Equation 3)}$$

In certain embodiments, the joint 30B (e.g., joint 30 which has torque sensor 36) may not be the same as the joint 30A (e.g., joint 30 controlled via commanded torque). For example, method 130 may be used to determine the estimated contact force $F_{est}$ using a sensed torque from a first joint 30 (e.g., joint 2). The estimated contact force $F_{est}$ may then be used by control system 18 (e.g., in a control loop) to determine a commanded torque for a second joint 30, different from the first joint 30 (e.g., joint 1).

In certain embodiments, the robotic manipulator 12 may include multiple joints 30B, such that the control system 18 may receive torque data from multiple joints. In some embodiments, the control system 18 may apply the method 130 to multiple joints 30B to obtain a more accurate estimate of the contact force between the tool 22 and surface 24. For example, a relationship (e.g., average) between the multiple estimated contact forces for the multiple joints 30B may be used to determine an aggregate estimated contact force.

By performing the embodiments described herein, the control system 18 may efficiently manage the control of the robotic manipulator 12 or other suitable robot system having different links connected through different joints. Further, by determining the estimated contact force based on the methodology described above, the present embodiments may provide the control system 18 feedback to ensure that the desired force is being applied without employing additional hardware sensors.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    detecting, via at least one processor, that a tool coupled to an end effector of a robot comprising a plurality of joints is contacting a surface, wherein the robot comprises a plurality of joint motors configured to control a plurality of motions of the plurality of joints, and wherein one or more control systems are configured to control each of the plurality of joint motors in a joint position mode;
    identifying, via the at least one processor, a first joint of the plurality of joints in response to detecting that the tool is contacting the surface;
    sending, via the at least one processor, a command to at least one of the one or more control systems associated with a first joint motor of the plurality of joint motors that corresponds to the first joint, wherein the command is configured to cause the at least one of the one or more control systems to operate in a torque mode; and
    sending, via the at least one processor, a joint torque value to the at least one of the one or more control systems, wherein the at least one of the one or more control systems is configured to cause the first joint to apply the joint torque value via the first joint motor.

2. The method of claim 1, wherein the one or more control systems are configured to control each of the plurality of joint motors in the joint position mode by adjusting at least one operation of at least one of the plurality of joint motors to cause at least one joint of the plurality of joints to move in accordance to a path.

3. The method of claim 1, wherein the torque mode comprises controlling a torque value applied by at least one of the plurality of joints via at least one of the plurality of joint motors.

4. The method of claim 1, wherein the at least one of the one or more control systems are configured to cause the first joint to apply the joint torque value via the first joint motor by adjusting one or more electrical waveforms provided to the first joint motor via a power electronic system.

5. The method of claim 1, wherein the tool of the robot is determined to be contacting the surface based on a position of a tool center point frame of the end effector relative to a location of the surface, sensor data received from one or more sensors coupled to the tool, or both.

6. The method of claim 5, wherein the one or more sensors comprise a force sensor, an optical sensor, an image sensor, or any combination thereof.

7. The method of claim 1, wherein identifying the first joint of the plurality of joints comprises selecting one of the plurality of joints positioned closest to a base reference frame associated with the robot, selecting an additional one of the plurality of joints corresponding to a link of the robot being closest to parallel to the surface as compared to other links of the robot, or selecting a predefined one of the plurality of joints.

8. A system, comprising:
    a robotic system comprising a plurality of joints and a plurality of links, wherein at least a portion of the plurality of links is coupled to at least a portion of the plurality of the joints;
    a drive system configured to control a plurality of joint motors configured to adjust a plurality of positions, a plurality of applied forces, or both of the plurality of joints;
    a control system configured to:
        detect that a tool coupled to an end effector of the robotic system is contacting a surface, wherein the control system is configured to control each of the plurality of joint motors in a joint position mode via the drive system;
        identify a first joint of the plurality of joints in response to detecting that the tool is contacting the surface;
        send a command to the drive system, wherein the command is configured to cause the drive system to operate a first joint motor of the plurality of joint motors in a torque mode; and
        send a joint torque value to the drive system, wherein the drive system is configured to cause the first joint to apply the joint torque value via the first joint motor.

9. The system of claim 8, wherein the control system is part of the drive system.

10. The system of claim 8, wherein the control system is configured to:
    identify a second joint of the plurality of joints in response to detecting that the tool is contacting the surface;
    send an additional command to the drive system, wherein the additional command is configured to cause the drive system to operate a second joint motor of the plurality of joint motors in the torque mode; and
    send an additional joint torque value to the drive system, wherein the drive system is configured to cause the second joint to apply the additional joint torque value via the second joint motor.

11. The system of claim 8, wherein the control system is configured to communicate with the drive system via a network.

12. The system of claim 8, comprising one or more sensors configured to detect that the tool is contacting the surface, determine a torque provided at least one of the plurality of joints, determine a position of at least another one of the plurality of joints, or any combination thereof.

13. The system of claim 8, wherein the tool is configured to apply a treatment to the surface.

14. The system of claim 13, wherein the treatment comprises grinding, sanding, polishing, painting, or any combination thereof.

15. The system of claim 8, wherein the control system is configured to:
   identify a second joint of the plurality of joints after identifying the first joint;
   send an additional command to the drive system, wherein the additional command is configured to cause the drive system to operate a second joint motor of the plurality of joint motors in the torque mode and operate the first joint motor in the joint position mode; and
   send an additional joint torque value to the drive system, wherein the drive system is configured to cause the second joint to apply the additional joint torque value via the second joint motor.

16. One or more non-transitory, computer readable media containing instructions that, when executed by one or more processors, cause the one or more processors to perform one or more operations comprising:
   detecting that a tool coupled to an end effector of a robot comprising a plurality of joints is contacting a surface, wherein the robot comprises a plurality of joint motors configured to control a plurality of motions of the plurality of joints, and wherein one or more control systems are configured to control each of the plurality of joint motors in a joint position mode;
   identifying a first joint of the plurality of joints in response to detecting that the tool is contacting the surface;
   sending a command to at least one of the one or more control systems associated with a first joint motor of the plurality of joint motors that corresponds to the first joint, wherein the command is configured to cause the at least one of the one or more control systems to operate in a torque mode; and
   sending a joint torque value to the at least one of the one or more control systems, wherein the at least one of the one or more control systems is configured to cause the first joint to apply the joint torque value via the first joint motor.

17. The one or more non-transitory, computer readable media of claim 16, wherein the instructions cause the one or more processors to perform the operations comprises estimating a contact force between the tool and the surface.

18. The one or more non-transitory, computer readable media of claim 17, wherein the instructions cause the one or more processors to estimate the contact force by:

receiving torque data associated with a second joint of the plurality of joints;
determining an angle associated with a line connecting the second joint with a center point of the tool relative to a base reference frame of the robot;
determining an inertial torque of one or more links of the robot based on a time derivative a vertical component of a motion of the center point, a time derivative of the angle, and one or more inertial properties associated with the robot; and
determining the contact force based on the torque data, the angle, the inertial torque, and one or more geometric properties of the robot.

19. The one or more non-transitory, computer readable media of claim 16, wherein the instructions cause the one or more processors to perform the operations comprises:
   identifying a second joint of the plurality of joints in response to detecting that the tool is contacting the surface;
   sending an additional command to the at least one of the one or more control systems, wherein the additional command is configured to cause the at least one of the one or more control systems to operate a second joint motor of the plurality of joint motors in the torque mode; and
   sending an additional joint torque value to the at least one of the one or more control systems, wherein the at least one of the one or more control systems is configured to cause the second joint to apply the additional joint torque value via the second joint motor.

20. The one or more non-transitory, computer readable media of claim 16, wherein the instructions cause the one or more processors to perform the operations comprises:
   identifying a second joint of the plurality of joints after identifying the first joint;
   sending an additional command to the at least one of the one or more control systems, wherein the additional command is configured to cause the at least one of the one or more control systems to operate a second joint motor of the plurality of joint motors in the torque mode and operate the first joint motor in the joint position mode; and
   sending an additional joint torque value to the at least one of the one or more control systems, wherein the at least one of the one or more control systems is configured to cause the second joint to apply the additional joint torque value via the second joint motor.

* * * * *